United States Patent
Hansen et al.

(10) Patent No.: US 11,547,050 B1
(45) Date of Patent: Jan. 10, 2023

(54) EXTRACTOR FAN ASSEMBLY WITH CLAMSHELL HUB

(71) Applicant: DEERE & COMPANY, Moline, IL (US)

(72) Inventors: Matthew J. Hansen, Thibodaux, LA (US); Dusk S. Mixon, Saint Amant, LA (US); Brian J. Fields, Thibodaux, LA (US); Guy Burch, Thibodaux, LA (US); Eric P. Richard, Thibodaux, LA (US); Todd J. Rodrigue, Thibodaux, LA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 17/445,212

(22) Filed: Aug. 17, 2021

(51) Int. Cl.
| | |
|---|---|
| *F04D 29/64* | (2006.01) |
| *A01D 45/10* | (2006.01) |
| *F04D 19/00* | (2006.01) |
| *F04D 25/06* | (2006.01) |
| *F04D 29/54* | (2006.01) |

(52) U.S. Cl.
CPC .......... *A01D 45/10* (2013.01); *F04D 19/002* (2013.01); *F04D 25/06* (2013.01); *F04D 29/545* (2013.01); *F04D 29/644* (2013.01)

(58) Field of Classification Search
CPC ....... A01D 45/10; F04D 19/002; F04D 25/06; F04D 29/545; F04D 29/644; F04D 29/329; F04D 29/34
See application file for complete search history.

(56) References Cited

U.S. PATENT DOCUMENTS

| | | | |
|---|---|---|---|
| 9,456,547 B2 | 10/2016 | Cazenave et al. | |
| 10,076,076 B2 | 9/2018 | Craig et al. | |
| 10,344,993 B2 | 7/2019 | Gettig et al. | |
| 2020/0137958 A1 | 5/2020 | Hansen et al. | |
| 2021/0227751 A1 | 7/2021 | Fattepur et al. | |
| 2022/0235782 A1* | 7/2022 | Villella | F04D 25/06 |

FOREIGN PATENT DOCUMENTS

| | | | | |
|---|---|---|---|---|
| CN | 104696276 A | * | 6/2015 | ........... F04D 29/329 |
| CN | 106402022 A | * | 2/2017 | ........... F04D 29/325 |
| CN | 111810442 A | * | 10/2020 | |
| JP | 0364969 A1 | * | 4/1990 | ........... F04D 29/325 |

OTHER PUBLICATIONS

English Machine Translation of CN-111810442-A, 2022.*
Image of Case Sugarcane Harvester Extractor Fan Assembly with Cover for Fan Hub (Jul. 13, 2021) (1 page).

* cited by examiner

*Primary Examiner* — Aaron R Eastman (57) ABSTRACT

An extractor fan assembly for an extractor of a sugarcane harvester comprises a motor, fan blades, and a clamshell hub. The motor comprises an output that rotates about an axis of rotation. The clamshell hub comprises a base and clamp jaws. The base is coupled to the output for rotation therewith about the axis of rotation. The clamp jaws are positioned angularly about the axis of rotation. Each clamp jaw is fastened to and cooperates with the base to clamp a respective fan blade of the fan blades therebetween to position the fan blades angularly about the axis of rotation.

17 Claims, 13 Drawing Sheets

EXTRACTOR FAN ASSEMBLY WITH CLAMSHELL HUB

FIELD OF THE DISCLOSURE

The present disclosure relates to extractors for sugarcane harvesters.

BACKGROUND OF THE DISCLOSURE

Sugarcane harvesters often have a chopper, an elevator, and one or more extractors. The chopper chops sugarcane stalks harvested by the sugarcane harvester into segments called "billets." The elevator lifts the billets to a higher elevation for discharge into a wagon for transport to a mill. A primary extractor is located between the chopper and the elevator. In sugarcane harvesters that have a secondary extractor, the secondary extractor is mounted to the upper discharge end of the elevator. Each extractor has a fan to induce a flow of air to separate leaves of the harvested sugarcane plants from the billets so as to clean the billets.

SUMMARY OF THE DISCLOSURE

According to an aspect of the present disclosure, there is disclosed an extractor fan assembly for an extractor of a sugarcane harvester. The extractor fan assembly comprises a motor, fan blades, and a clamshell hub. The motor comprises an output that rotates about an axis of rotation. The clamshell hub comprises a base and clamp jaws. The base is coupled to the output for rotation therewith about the axis of rotation. The clamp jaws are positioned angularly about the axis of rotation. Each clamp jaw is fastened to and cooperates with the base to clamp a respective fan blade of the fan blades therebetween to position the fan blades angularly about the axis of rotation. The clamshell hub is relatively compact, promoting generation of airflow by the fan blades 58 radially for cleaning of billets.

The above and other features will become apparent from the following description and accompanying drawings.

BRIEF DESCRIPTION OF THE DRAWINGS

The detailed description of the drawings refers to the accompanying figures in which.

DETAILED DESCRIPTION OF THE DRAWINGS

Figure 1:
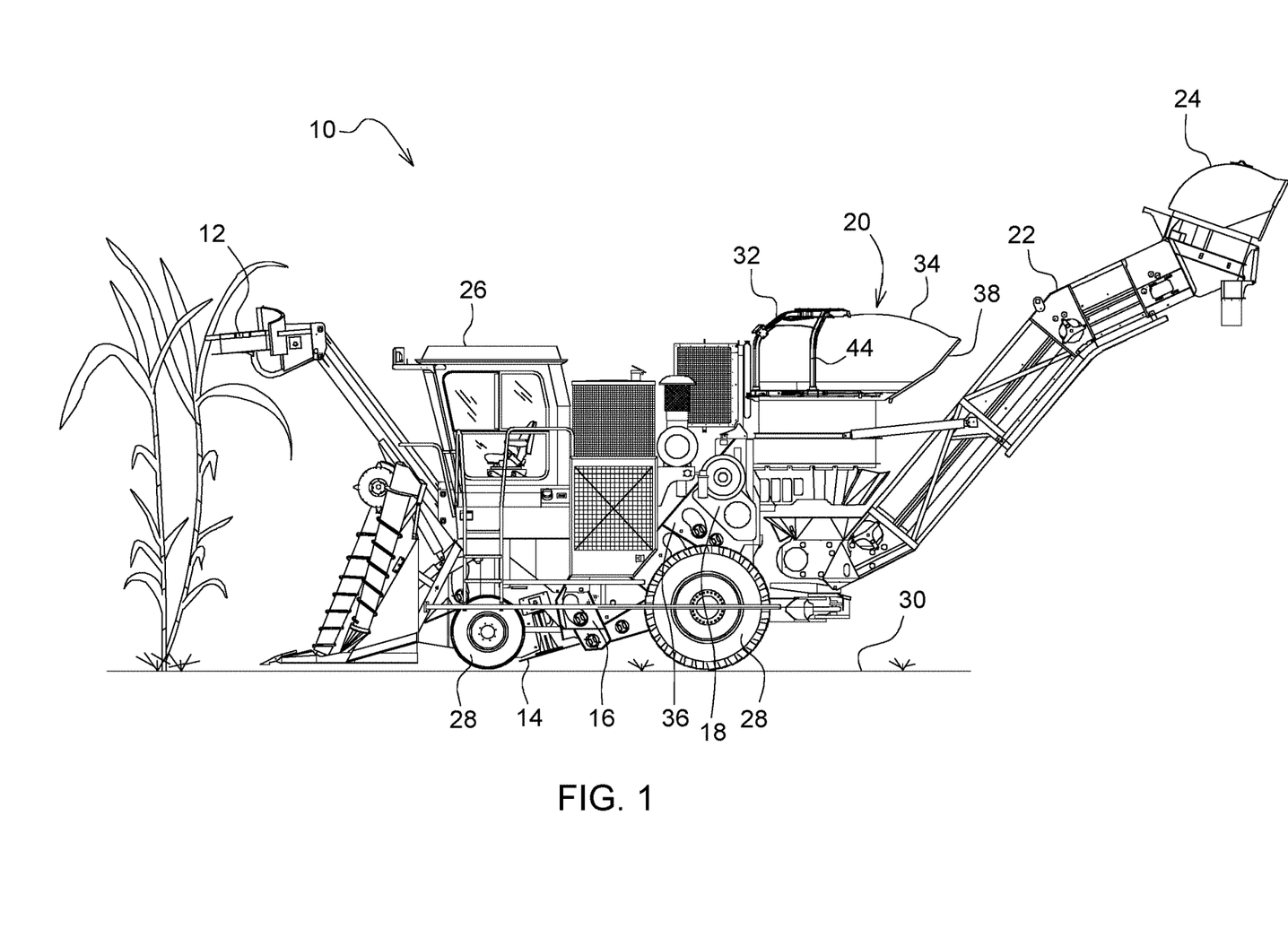
FIG. 1 is a side elevational view showing a sugarcane harvester with a primary extractor.

Referring to FIG. 1, a sugarcane harvester 10 is configured to harvest sugarcane. The harvester 10 includes, for example, a topper 12, one or more basecutters 14 (only one basecutter shown), a feed section 16, a chopper 18, a primary extractor 20, an elevator 22, and a secondary extractor 24. The topper 12 cuts some of the leaves off the top of the sugarcane plants before the plants are severed by the one or more basecutters 14, but may not remove all the leaves from the plants before ingestion into the harvester 10. Each of the one or more basecutters 14 includes a left cutting disk and a right cutting disk (only a left cutting disk shown). The left and right cutting disks of each of the one or more basecutters 14 cooperate with one another to sever the stalks of sugarcane plants at a location near the ground. The feed section 16 receives a mat of severed sugarcane from each of the one or more basecutters 14 and feeds the one or more mats rearwardly. The chopper 18 receives the one or more mats from the feed section 16 and cuts the sugarcane stalks into billets. The primary extractor 20 is positioned between the chopper 18 and the elevator 22 to separate leaves ingested into the harvester 10 from the billets discharged from the chopper 18 and removes the leaves from the harvester 10. The elevator 22 is positioned at the rear of the harvester 10 to receive the billets and convey them to an elevated position where the billets are discharged from the harvester 10 into a wagon to be hauled away. The secondary extractor 24 is mounted to the upper discharge end of the elevator 22 to further separate from the billets leaves that may not have been removed by the primary extractor 20.

The harvester 10 includes an operator's station 26 and traction elements 28. A human operator can operate the harvester 10 from the operator's station 26. The traction elements 28 are positioned on the left and right sides of the harvester 10 for engaging the ground 30 and propelling the harvester 10. Each traction element 28 may be, for example, a ground-engaging wheel or a track unit.

Figure 2:
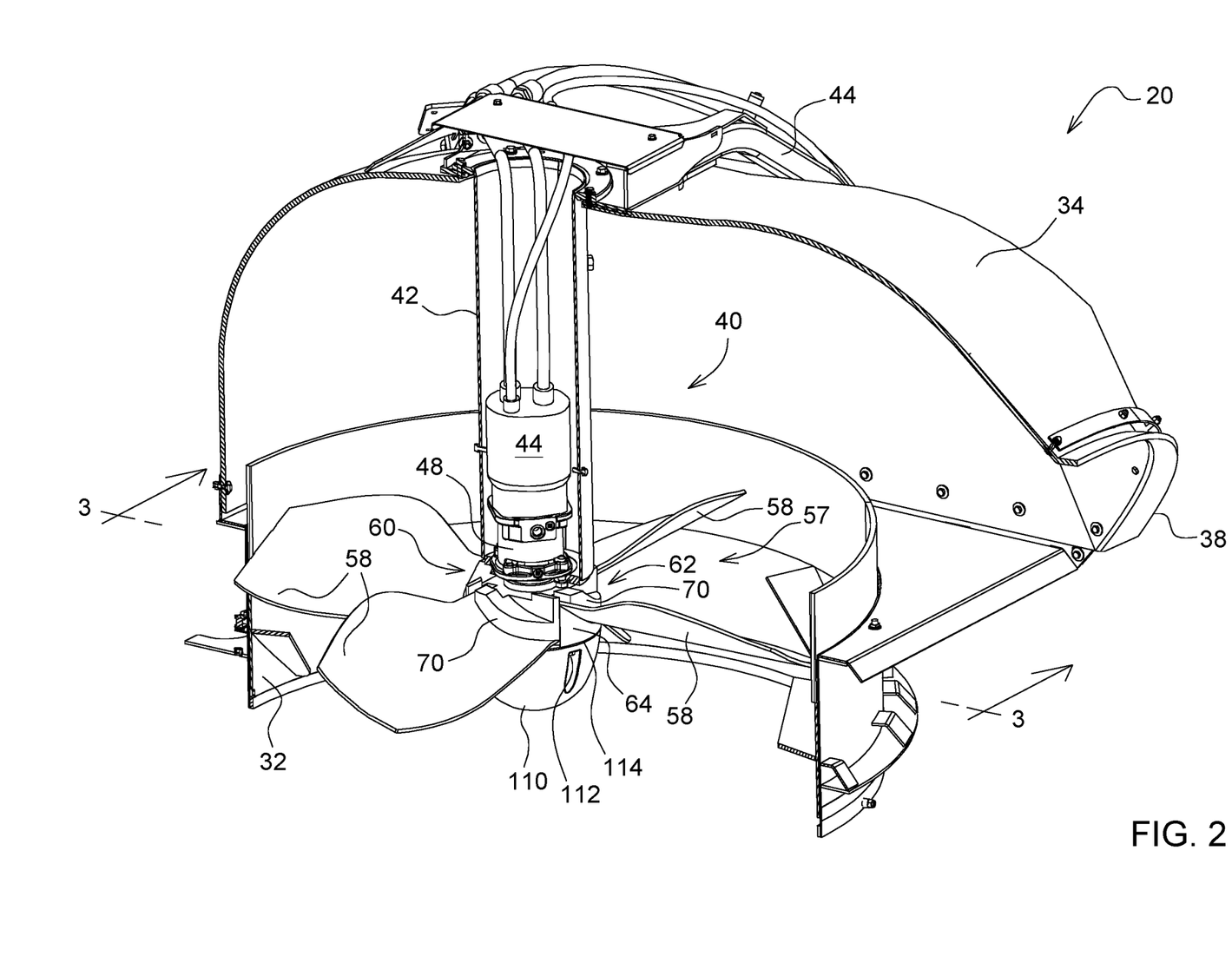
FIG. 2 is a perspective view, with portions broken away, showing an extractor fan assembly of the primary extractor.

Referring to FIG. 2, the primary extractor 20 includes an extractor frame 32 and a hood 34 mounted to the extractor frame 32. The extractor frame 32 is mounted to a frame 36 of the harvester 10 for rotation by an extractor rotator. The extractor rotator can rotate the primary extractor 20 to redirect discharge of leaves from a discharge outlet 38 of the hood 34.

Figure 3:
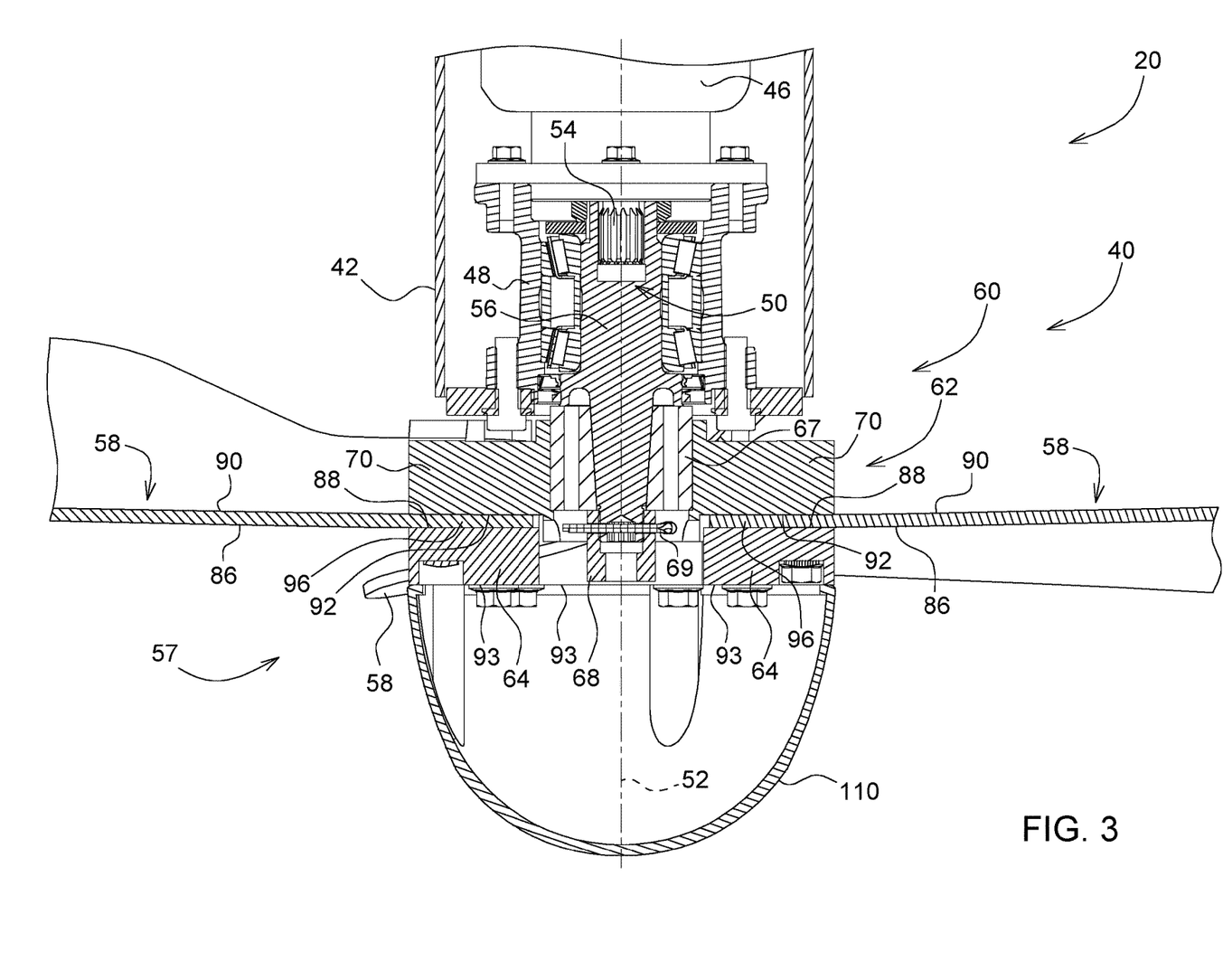
FIG. 3 is a sectional view, taken along lines 3-3 of FIG. 2, with portions broken away.

Referring to FIGS. 2 and 3, the extractor 20 includes an extractor fan assembly 40. The assembly 40 includes a tubular column or can 42 coupled to and depending from a spider 44 of the extractor frame 32, a motor 46 positioned within the can 42, and a bearing assembly 48 with its housing coupled (e.g., bolted) to an end cap of the can 42, the end cap coupled (e.g., welded) to a sleeve of the can 42. The housing of the motor 46 is fixed atop the housing of the bearing assembly 48.

The motor 46 includes an output 50 that rotates about an axis of rotation 52. The output 50 includes a motor shaft 54 and a shaft extension 56 splined to the motor shaft 54 and extending through the bearing assembly 48 downwardly out of the can 42.

The shaft extension 56 is rotatably coupled to the bearing assembly 48. A nut is threaded to the shaft extension 56 near the top thereof and tightened against a hardened spacer ring so as to press the hardened spacer ring against the inner race of a double tapered bearing set of the bearing assembly. The outer race of the double tapered bearing set is thereby pressed against a shoulder of the housing of the bearing assembly.

Figure 4:
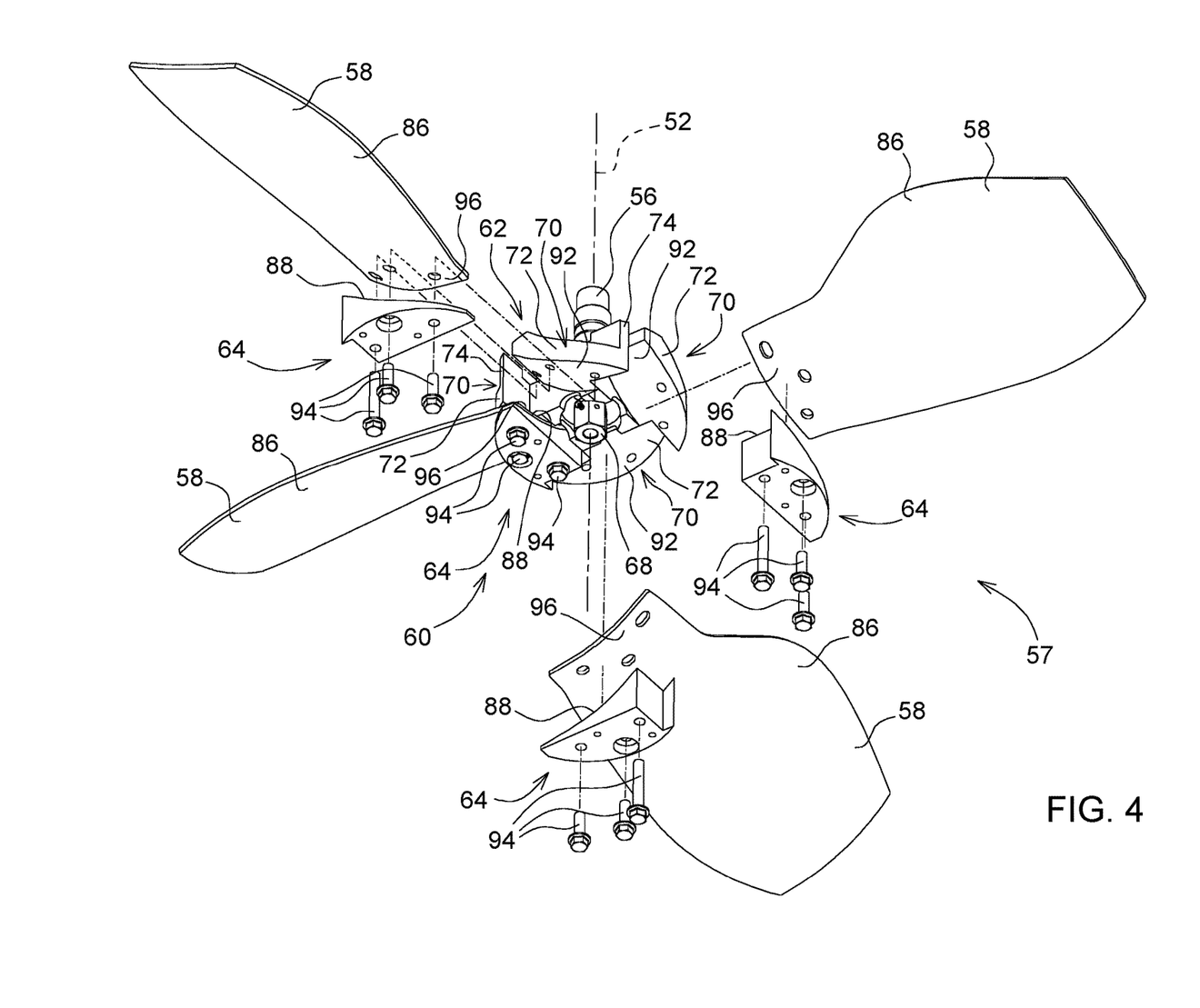
FIG. 4 is an exploded perspective view showing a fan of the extractor fan assembly.
Figure 5:
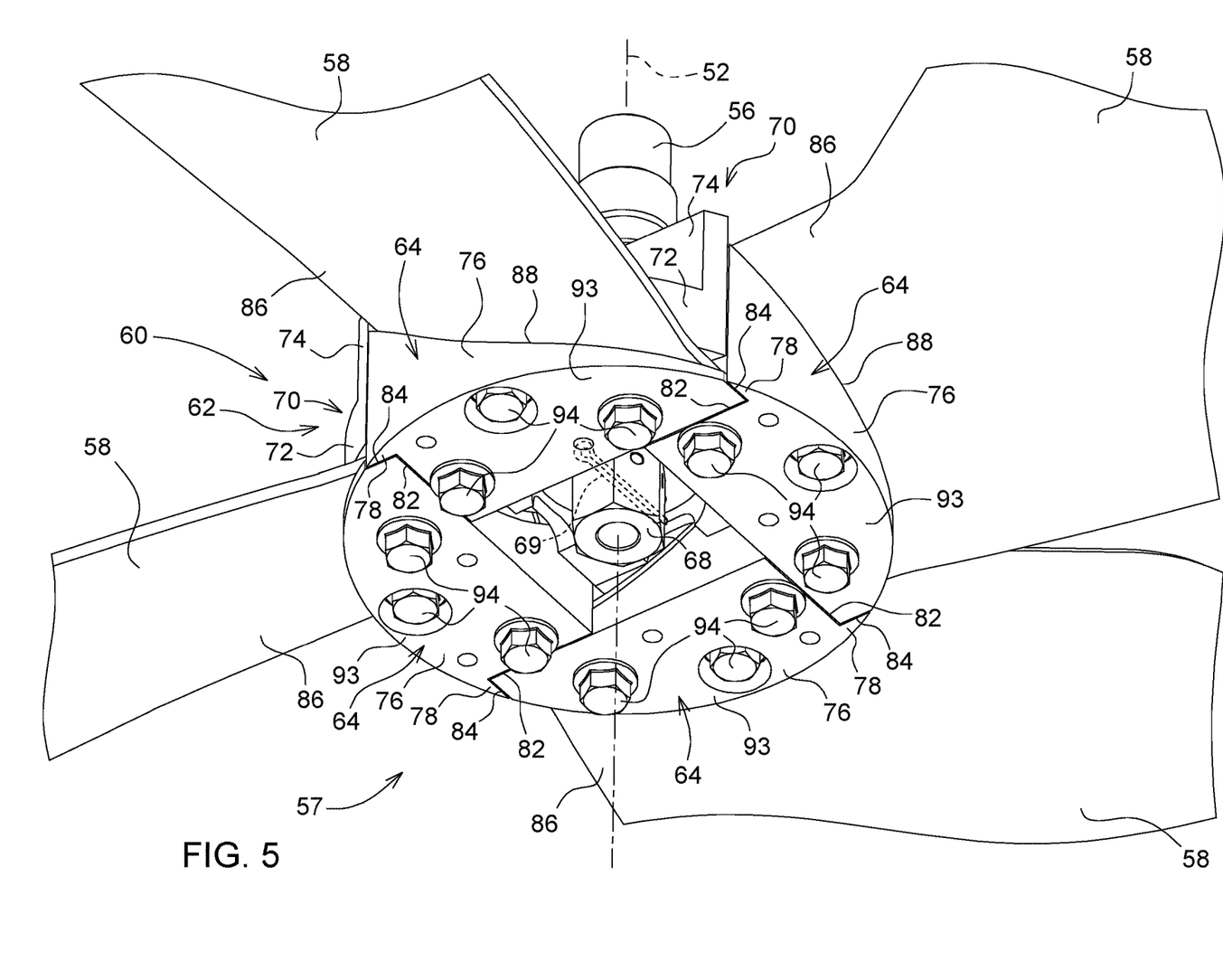
FIG. 5 is a perspective view, with portions broken away, showing the fan with fan blades and a clamshell hub clamping the fan blades.
Figure 6:
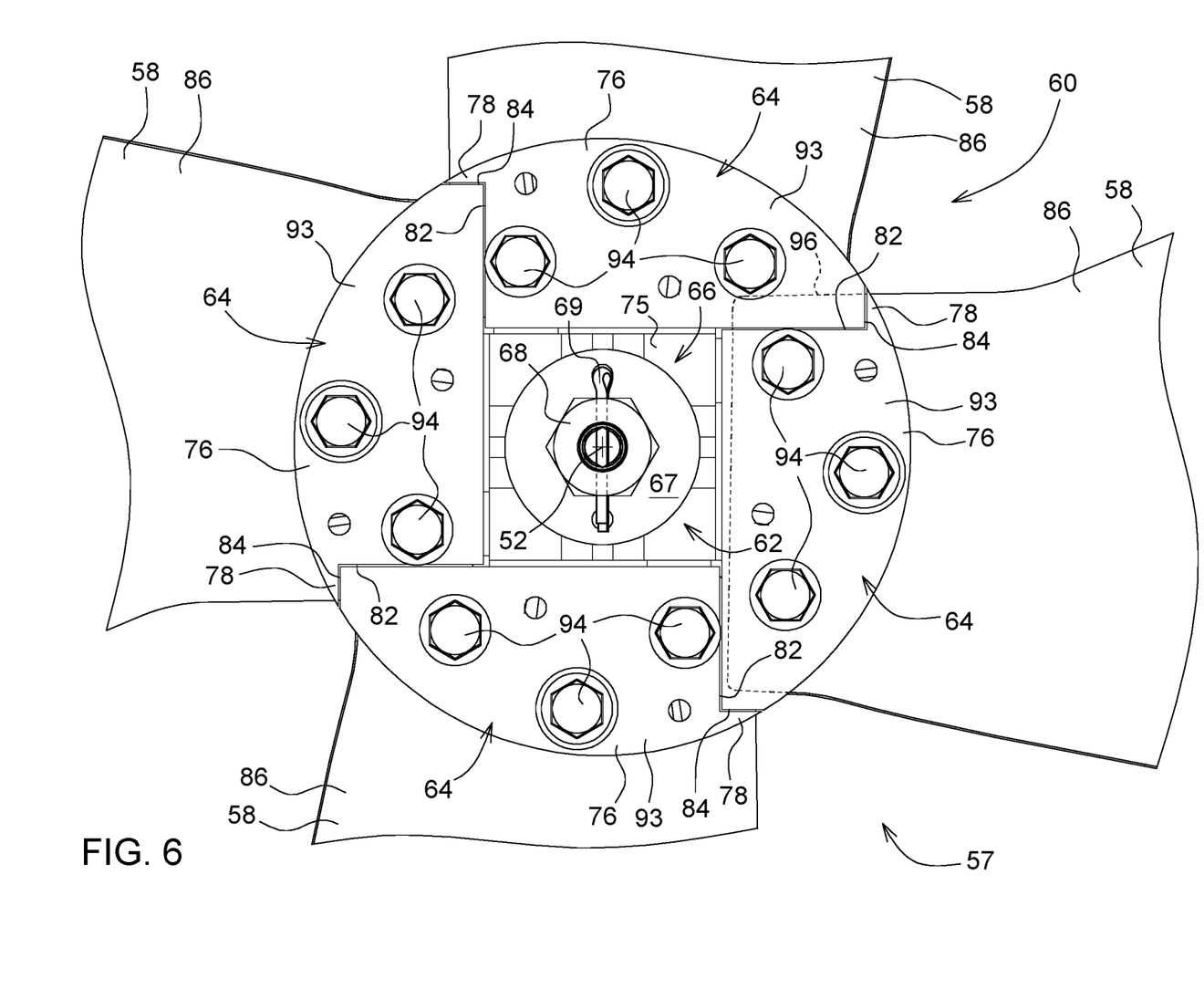
FIG. 6 is a bottom view, with portions broken away, showing clamp jaws of the clamshell hub.

Referring FIGS. 3-5, the extractor fan assembly 40 includes a fan 57. The fan 57 includes fan blades 58 (e.g., four fan blades) and a clamshell hub 60. The clamshell hub 60 includes a base 62 and clamp jaws 64 (e.g., four clamp jaws). The base 62 is coupled to the output 50 for rotation therewith about the axis of rotation 52. The clamp jaws 64 are positioned angularly about the axis of rotation 52. Each clamp jaw 64 is fastened to and cooperates with the base 62 to clamp a respective fan blade 58 of the fan blades 58 therebetween to position the fan blades 58 angularly about the axis of rotation 52. Such a clamshell hub 60 is relatively compact in design with respect to hub diameter, to increase the airflow-generation portion of each fan blade 58 to generate more airflow for a given rotational speed of the fan blade 58 about the axis of rotation 52, to enhance billet cleaning.

The motor 48 is drivingly coupled to the hub 60 to rotate the hub 60 and the fan blades 58 coupled thereto about the axis of rotation 52. The hub 60 receives and is coupled to the output 50 for rotation of the hub 60 therewith about the axis of rotation 52. The base 62 of the hub 60 includes a central support 66 that receives and is coupled to the output 50 for rotation of the base 62 therewith about the axis of rotation 52. A sleeve 67 of the central support 66 includes a tapered hole that receives and mates with a tapered portion of the shaft extension 56. A nut 68 is threaded onto the tapered portion of the shaft extension 56 and a cotter pin 69 passes through corresponding holes formed in the nut 68 and an end portion of the shaft extension 56, fixing the base 62 of the hub 60 to the output 50 for rotation therewith about the axis of rotation 52. The hub 60 may be coupled to the output 50 in a wide variety of ways.

Referring to FIGS. 7-10, the base 62 includes platforms 70 to which the fan blades 58 are respectively coupled. The platforms 70 are coupled to and positioned angularly about the central support 66 relative to the axis of rotation 52.

Each platform 70 includes a main body 72 and a connecting web 74. The main body 72 slopes axially and angularly from, the central support 66 relative to the axis of rotation 52. An upper end portion of the main body 72 is coupled to the central support 66. The web 74 interconnects the main body 72 and the central support 66. The web 74 provides an inner margin of the platform 70, and extends perpendicular to a radial dimension of the base 62 relative to the axis of rotation 52.

Referring to FIGS. 6-10, in the illustrated example, the central support 66 includes a wall 75 to which the sleeve 67 is coupled (e.g., welded). The sleeve 67 has an external, cylindrical surface received in a hole defined by an internal, cylindrical surface of the wall 75 (e.g., both cylindrical surfaces being a right circular cylindrical surface). In other examples, the sleeve 67 and the wall 75 may be integrated such that the central support 66 is a one-piece structure. The platforms 70 are coupled to and positioned angularly about the wall 75 relative to the axis of rotation. The platforms 70 and the wall 75 cooperate to provide a one-piece structure (e.g., casting). In examples where the sleeve 67 and the wall 75 are integrated, the base 62 as a whole may be a one-piece structure (e.g., casting). In other examples, the platforms 70 and the wall 75 may be a multi-piece structure.

Referring to FIGS. 5, 6, 11, and 12, each clamp jaw 64 comprises a main body 76 and an extension portion 78. The main body 76 is spaced apart from an immediately adjacent platform 70 to define a gap 80 therebetween, and the extension portion 78 extends angularly beyond the main body 76 over the gap 80 toward the immediately adjacent platform 70 to block radial entry of debris into the gap 80 relative to the axis of rotation 52. The main body 76 and the extension portion 78 cooperate to define a right-angled notch 82 therebetween, and an immediately adjacent clamp jaw 64 includes a truncated tip 84 forming a right-angled corner 86 received in and fitted into the notch 82, promoting a relatively compact design of the hub 60. In the illustrated example, the clamp jaw 64, with its main body 76 and extension portion 78, is a one-piece structure (e.g., a casting). In other examples, the clamp jaw 64 may be a multi-piece structure.

Referring to FIGS. 5-8, the clamps jaws 64 and the platforms 70 cooperate to provide the hub 60 with a relatively compact, cylindrical radially outer margin (e.g., a right circular cylindrical outer margin). Each of the main bodies 72 of the platforms 70 provide a radially outer margin of the platform 70, which is curved with a constant radius relative to the axis of rotation 52. The main body 76 and extension portion 78 of each of the clamp jaws 64 provides a radially outer margin of the clamp jaw 64, which is likewise curved with the same constant radius relative to the axis of rotation 52. The radially outer margins of the platforms 70 and the radially outer margins of the clamp jaws 64 cooperate to provide the relatively compact, cylindrical radially outer margin of the hub 60. The cylindrical shape is provided to prevent or otherwise minimize collection of debris on the hub 60.

Referring to FIGS. 3-6, and 9, each clamp jaw 64 is fastened to and cooperates with a respective platform 70 of the base 62 to clamp a respective fan blade 58 therebetween. The clamp jaw 64 is positioned in mating contact with a first side 86 of the fan blade 58. A mating portion 88 of the clamp jaw 64 is positioned in mating contact with the first side 86. The main body 76 of the clamp jaw 64 and the extension portion 78 of the clamp jaw 64 cooperate to provide the mating portion 88 of the clamp 64. The base 62 is positioned in mating contact with a second side 90 of the fan blade 58 opposite to the first side 86. For example, a mating portion 92 of the platform 70 is positioned in mating contact with the second side 90. The main body 72 of the platform 70 includes the mating portion 92. The main body 76 of the clamp jaw 64 underlies, is fastened to, and cooperates with the platform 70 to clamp the fan blade 58 therebetween.

Each fan blade 58 slopes axially and angularly with respect to the axis of rotation 52. The mating portion 88 of the clamp jaw 64 slopes axially and angularly with the first side 86 of the fan blade 58 with respect to the axis of rotation 52. The mating portion 92 of the platform 70 of the base 62 slopes axially and angularly with the second side 90 of the fan blade 58 with respect to the axis of rotation 52. The mating portion 88 of the clamp jaw 64 is an upper mating portion facing upwardly at least in part, and the mating portion 92 of the platform 70 is a lower mating portion facing downwardly at least in part.

Each clamp jaw 64 includes a lower surface 93 facing downwardly at least in part. The lower surfaces 93 of the clamp jaws 64 are positioned in co-planar relation to one another.

The fan 57 includes fasteners 94 coupling the clamp jaws 64 and the fan blades 58 to the base 62. A plurality of the fasteners 94 couple each clamp jaw 64 and the respective fan blade 58 to the respective platform 70. The plurality of fasteners 94 extend through the clamp jaw 64 and the fan blade 58 into the platform 70, such as into the main body 72 of platform 70. The plurality of fasteners 94 includes, for example, three fasteners 94, two of which may be the same size and shorter than the third. The fasteners 94 are configured and arranged (e.g., in length, and, with respect to one of the shorter fasteners 94, countersunk) for sufficient engagement with the platform 70. The fasteners 94 may be configured in a wide variety of ways. Illustratively, each fastener 94 is a flange bolt.

Clamping each fan blade 58 between a respective clamp jaw 64 and the base 62 spreads loading of mounting the fan blade 58. The surface area contact between the mating portions 88, 92 and the first and second sides 86, 90 facilitates distribution of the load and a corresponding reduction in hub diameter and in the total number of fasteners 94 (e.g., from 16 to 12). The fasteners 94 may be said to be in "double shear," with the mating portions 88, 92 positioned on opposite sides of the fan blade 58. The blades 58 may be said to be mounted in "double shear" with the fasteners 94 passing through the clamp jaws 64 the blades 58 into the base 62 so as to be threaded thereto, such that the clamps jaws 64 and the base 62 with their mating portions 88, 92, along with the fasteners 94, cooperate to provide a double shear joint for the blades 58.

Figure 7:
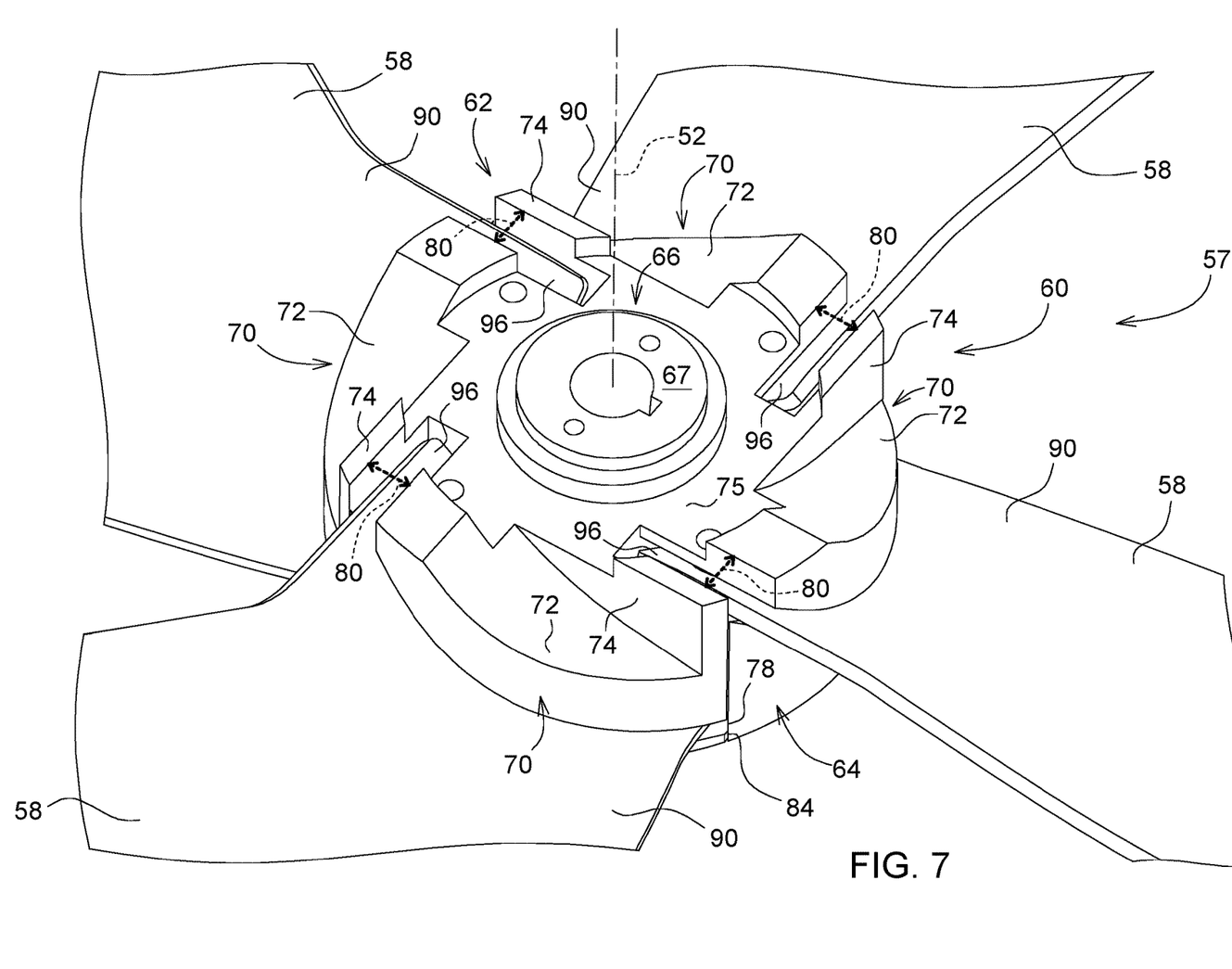
FIG. 7 is a perspective view, with portions broken away, showing a base of the clamshell hub.
Figure 8:
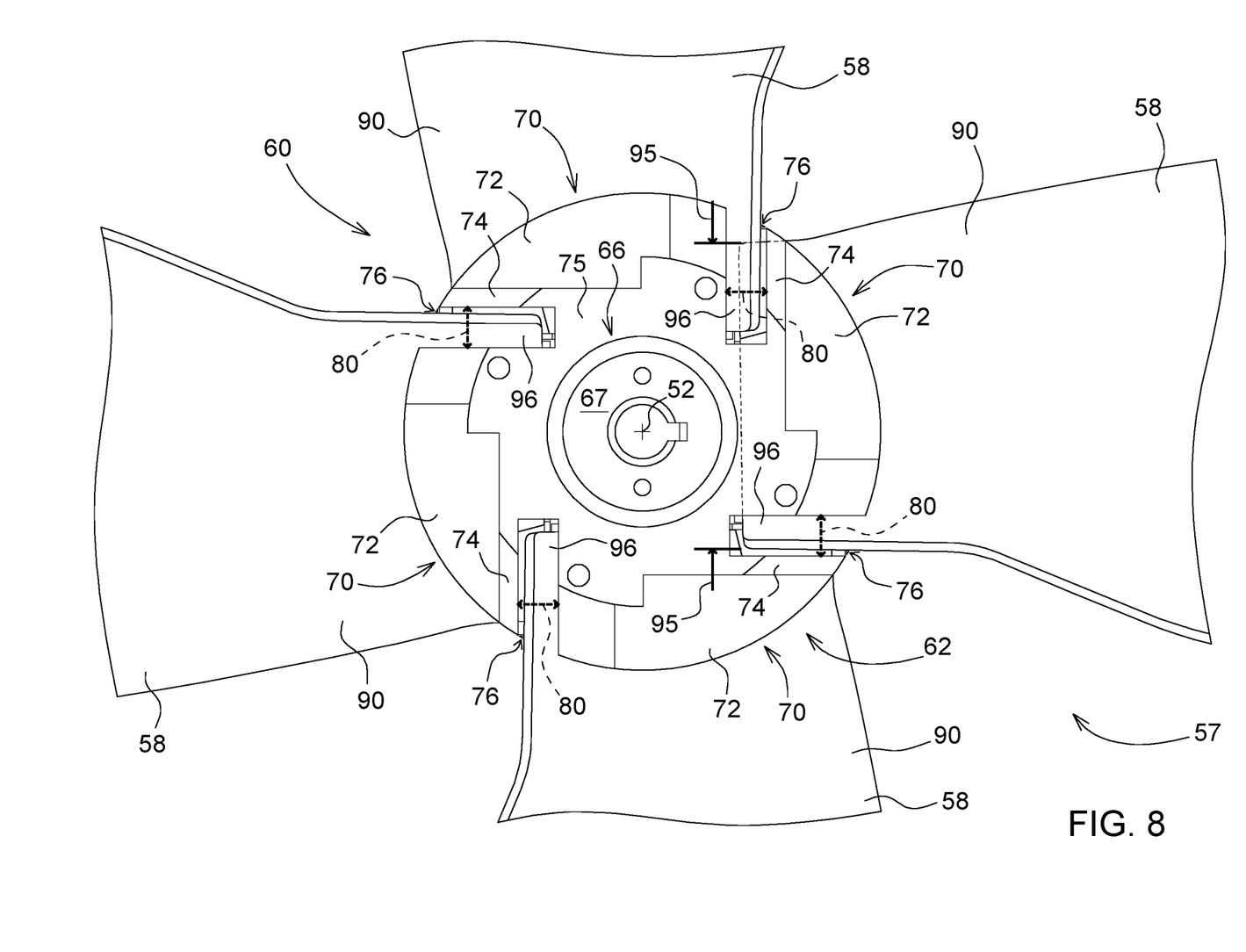
FIG. 8 is a top plan view, with portions broken away, showing the fan.
Figure 9:
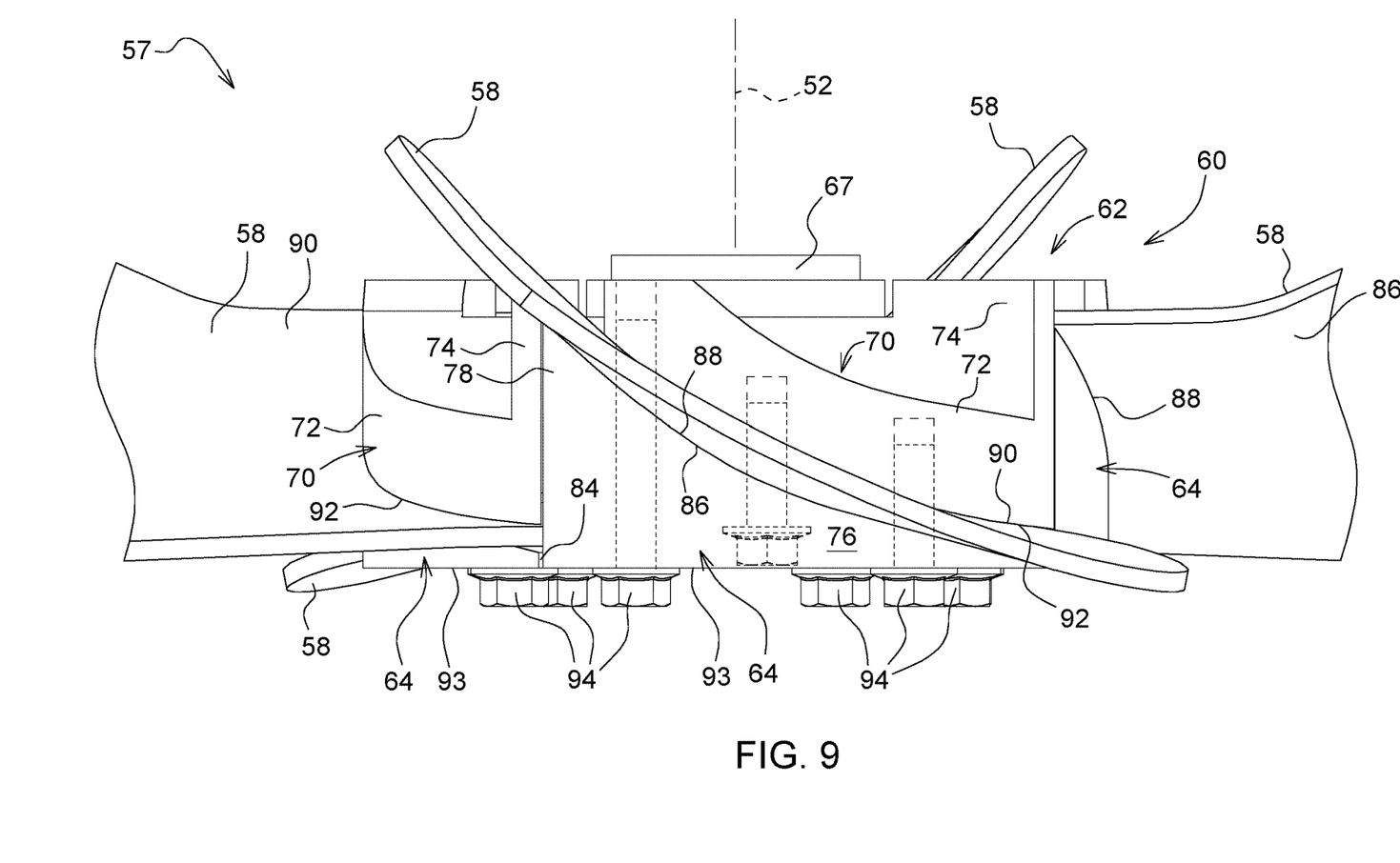
FIG. 9 is a side elevation view, with portions broken away, showing the fan.
Figure 10:
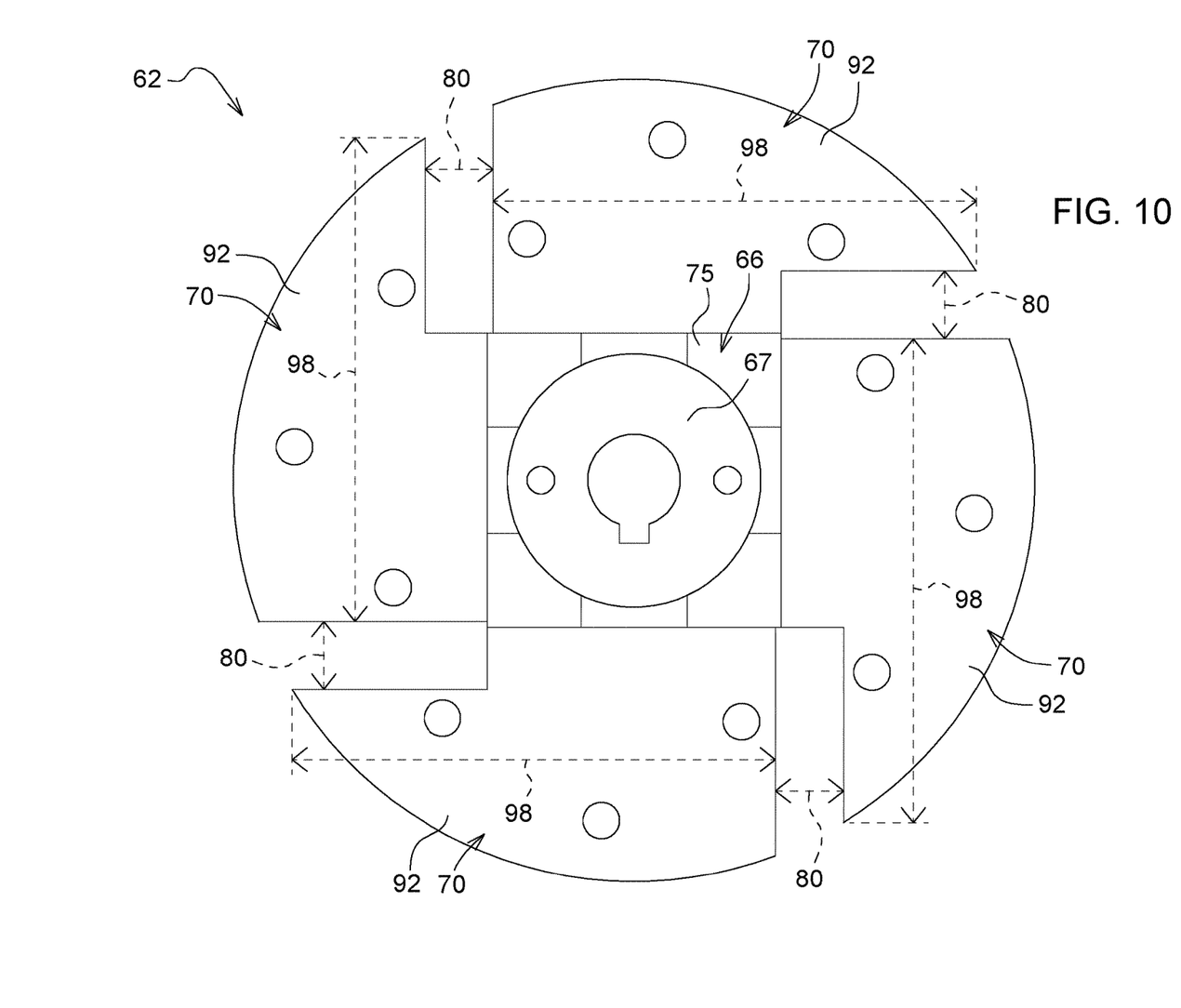
FIG. 10 is a bottom view showing the hub.
Figure 11:
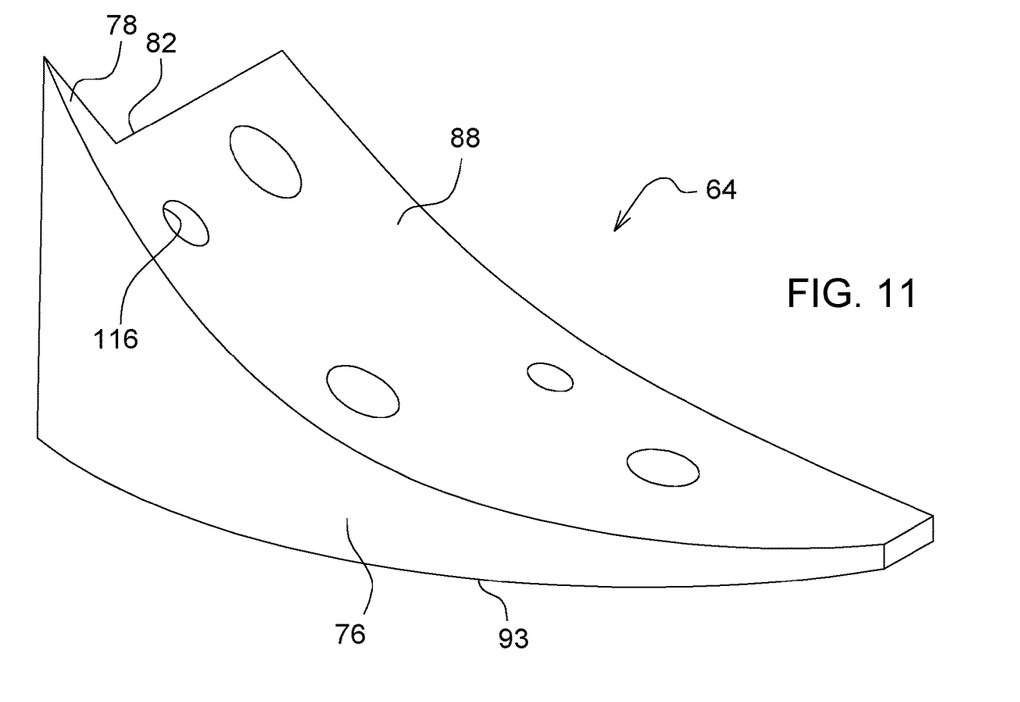
FIG. 11 is a perspective view showing a clamp jaw.
Figure 12:
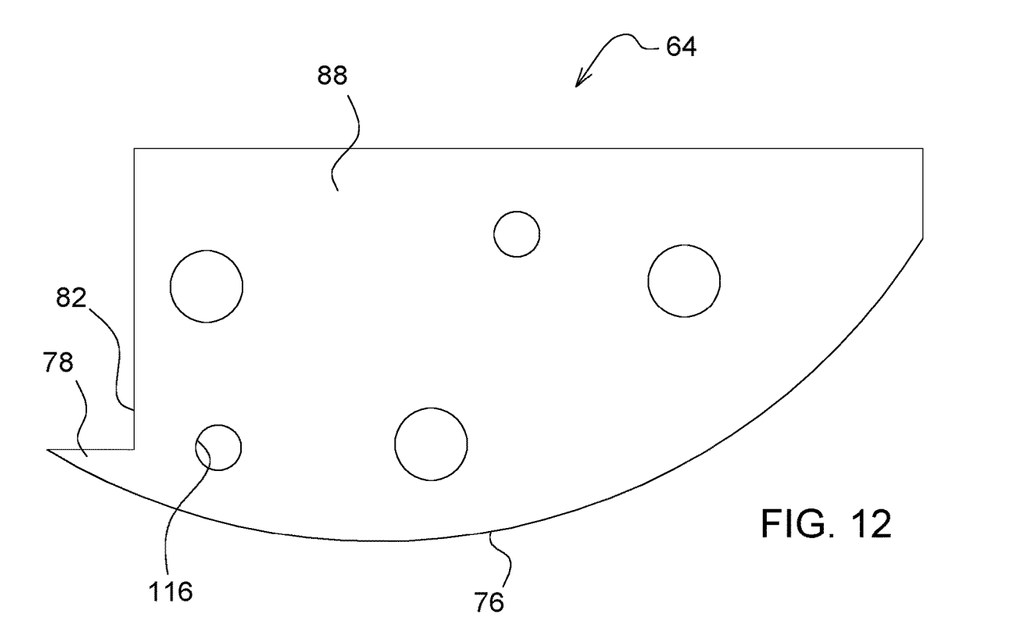
FIG. 12 is a top plan view showing a clamp jaw.

Referring to FIGS. 7, 8, and 10, the span of the clamp jaws 64 and the platforms 70 promote clamping of the fan blades 58 and corresponding load spreading. Each clamp jaw 64 spans a majority of a width 95 of the respective fan blade 58, and the respective platform 70 spans a majority of the width 95 of the fan blade 58. The width 95 is, for example, the width of a root 96 of the fan blade 58, with the root 96 being the radially inner portion of the fan blade 58 fastened to the hub 60. Each of the clamp jaw 64 and the main body 72 of the platform 70 spans a majority of the width 95 of the root 96 of the fan blade 58. Illustratively, the clamp jaw 64 spans the width 95 of the root 96 of the fan blade 58. The main body 76 of the clamp jaw 64 and the extension portion 78 of the clamp jaw 64 cooperate to span the width 95. The main body 76 of the clamp jaw 64 spans a length 98 of the platform 70.

Figure 13:
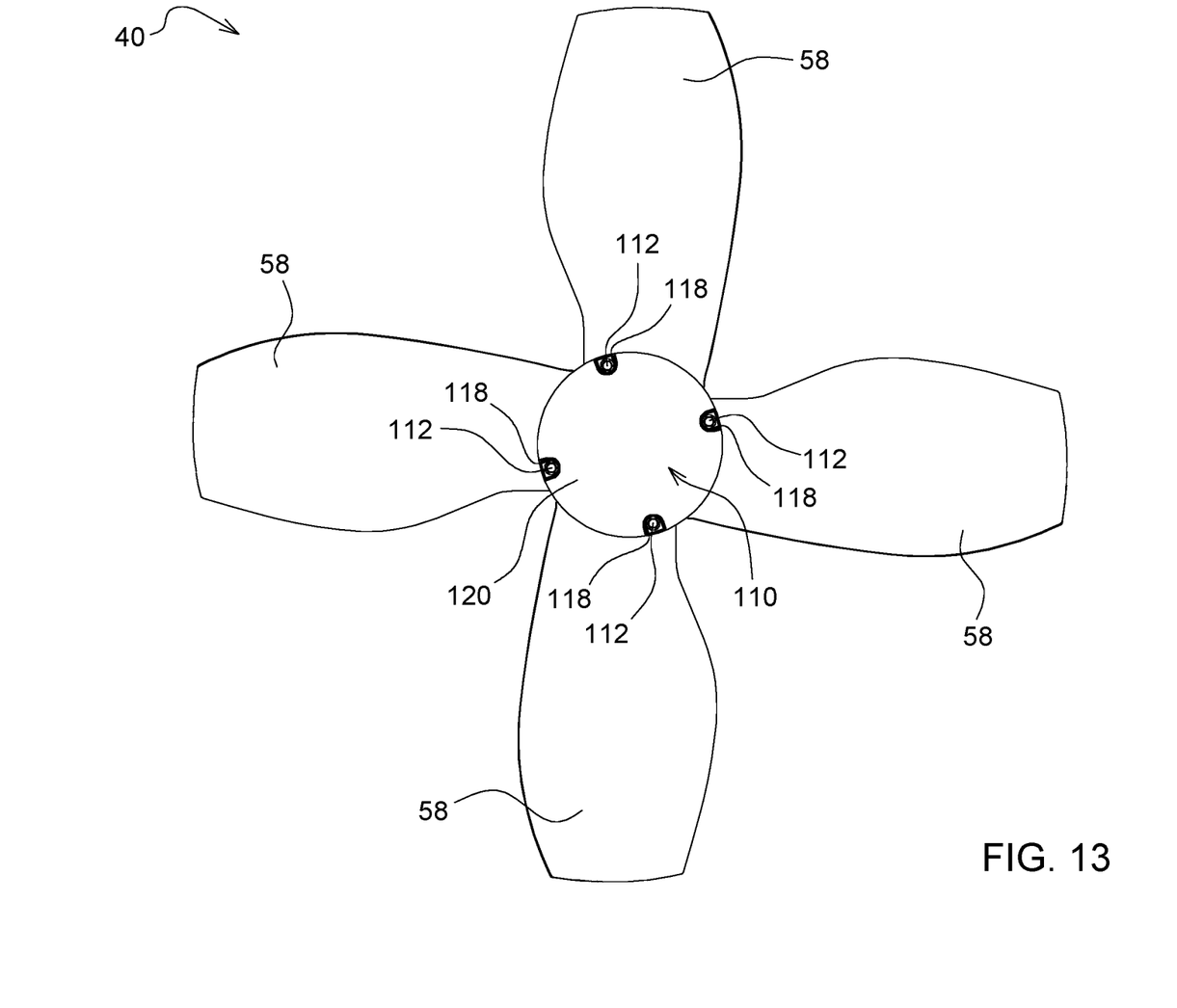
FIG. 13 is a bottom view, with portions broken away, showing the fan.
Figure 14:
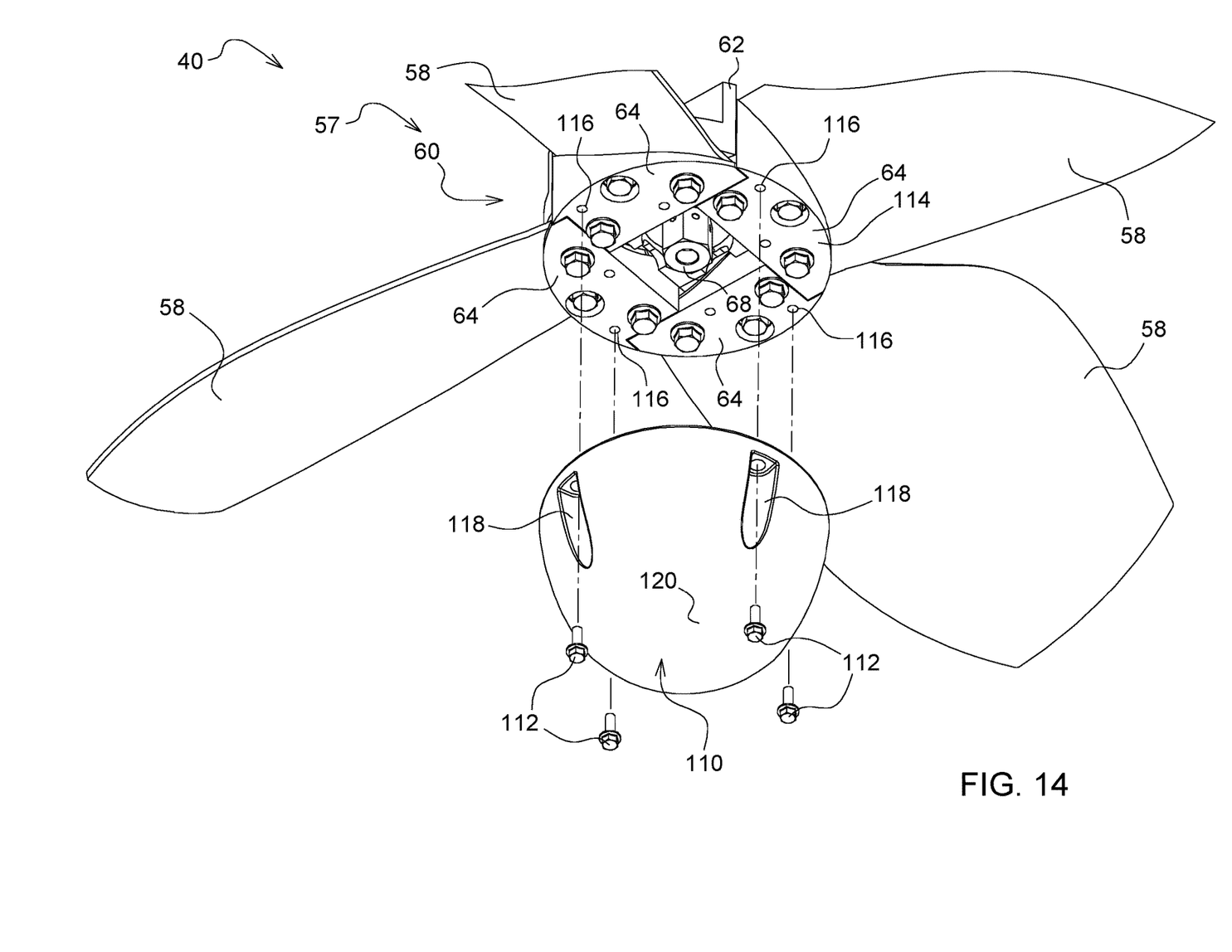
FIG. 14 is a perspective view, with portions broken away, showing a cover exploded from the clamshell hub.

Referring to FIGS. 13 and 14, the extractor fan assembly 40 includes a cover 110 and fasteners 112 fastening the cover 110 to a bottom 114 of the hub 60. The cover 110 covers the bottom 112 of the hub 60, preventing collection of debris thereon. The cover 110 covers, for example, the bottom of the fasteners 94, clamp jaws 64, central support 66, and nut 68.

The cover 110 is fastened to the clamp jaws 64. The fasteners 112 (e.g., four bolts) are positioned angularly and evenly about the axis of rotation 52. Each fastener 112 extends through a fastener-receiving hole in a respective recessed portion 118 formed in a dome 120 of the cover 110 and extends into a fastener-receiving hole 116 formed in a respective clamp jaw 64.

Threads and welds are not shown for ease of illustration. However, it is to be appreciated that bolts, nuts, and corresponding mating surfaces would have threads.

While the above describes example embodiments of the present disclosure, these descriptions should not be viewed in a limiting sense. Rather, other variations and modifications can be made without departing from the scope and spirit of the present disclosure as defined in the appended claims.

What is claimed is:

1. An extractor fan assembly for an extractor of a sugarcane harvester, the extractor fan assembly comprising:
a motor comprising an output that rotates about an axis of rotation,
fan blades,
a clamshell hub comprising a base and clamp jaws, the base coupled to the output for rotation therewith about the axis of rotation, the clamp jaws positioned angularly about the axis of rotation, each clamp jaw fastened to and cooperating with the base to clamp a respective fan blade of the fan blades therebetween to position the fan blades angularly about the axis of rotation, and
with respect to each clamp jaw and the respective fan blade, a fastener extending from the clamp jaw through the respective fan blade to the base, coupling the clamp jaw and the fan blade to the base.

2. The extractor fan assembly of claim 1, wherein:
the base comprises a central support and platforms, the central support receives and is coupled to the output for rotation of the base therewith about the axis of rotation, the platforms are coupled to and positioned angularly about the central support relative to the axis of rotation, and
with respect to each clamp jaw and the respective fan blade, the clamp jaw is fastened to and cooperates with a respective platform of the platforms to clamp the fan blade therebetween.

3. The extractor fan assembly of claim 2, wherein, with respect to each clamp jaw, the respective fan blade, and the respective platform, the clamp jaw comprises a main body and an extension portion, the main body underlies, is fastened to, and cooperates with the platform to clamp the fan blade therebetween, the main body is spaced apart from an immediately adjacent platform of the platforms to define a gap therebetween, and the extension portion extends angularly beyond the main body over the gap toward the immediately adjacent platform to block radial entry of debris into the gap relative to the axis of rotation.

4. The extractor fan assembly of claim 3, wherein, with respect to each clamp jaw, the main body and the extension portion cooperate to define a notch therebetween, and an immediately adjacent clamp jaw of the clamp jaws comprises a truncated tip forming a corner received in the notch.

5. The extractor fan assembly of claim 1, wherein, with respect to each clamp jaw and the respective fan blade, the clamp jaw is positioned in mating contact with a first side of the fan blade, and the base is positioned in mating contact with a second side of the fan blade opposite to the first side.

6. The extractor fan assembly of claim 5, wherein:
the base comprises platforms positioned angularly about the axis of rotation,
each fan blade slopes axially and angularly with respect to the axis of rotation,
with respect to each clamp jaw and the respective fan blade, a mating portion of the clamp jaw is positioned in mating contact, and slopes axially and angularly, with the first side of the fan blade with respect to the axis of rotation, and a mating portion of a respective platform of the platforms is positioned in mating contact, and slopes axially and angularly, with the second side of the fan blade with respect to the axis of rotation.

7. The extractor fan assembly of claim 1, wherein, with respect to each clamp jaw and the respective fan blade, the fastener is included in fasteners coupling the clamp jaw and the fan blade to the base.

8. The extractor fan assembly of claim 7, wherein:
the base comprises a central support and platforms, the central support receives and is coupled to the output for rotation of the base therewith about the axis of rotation, the platforms are coupled to and positioned angularly about the central support relative to the axis of rotation, and with respect to each clamp jaw and the respective fan blade, the fasteners couple the clamp jaw and the fan blade to a respective platform of the platforms.

9. The extractor fan assembly of claim 8, wherein, with respect to each clamp jaw, the respective fan blade, and the respective platform, the fasteners extend through the clamp jaw and the fan blade into the platform.

10. The extractor fan assembly of claim 1, wherein each clamp jaw comprises an upper mating portion facing upwardly at least in part and positioned in mating contact with the respective fan blade and a lower surface facing downwardly at least in part, and the lower surfaces of the clamp jaws are positioned in co-planar relation to one another.

11. The extractor fan assembly of claim 1, comprising a cover covering a bottom of the clamshell hub and fastened to the clamp jaws.

12. A sugarcane harvester comprising the extractor fan assembly of claim 1.

13. The extractor fan assembly of claim 1, wherein, with respect to each clamp jaw and the respective fan blade, the fastener extends through the respective fan blade axially relative to the axis of rotation.

14. An extractor fan assembly for an extractor of a sugarcane harvester, the extractor fan assembly comprising:

a motor comprising an output that rotates about an axis of rotation, fasteners, fan blades, and a clamshell hub comprising a base and clamp jaws, the base coupled to the output for rotation therewith about the axis of rotation, the clamp jaws positioned angularly about the axis of rotation, each clamp jaw fastened to and cooperating with the base to clamp a respective fan blade of the fan blades therebetween to position the fan blades angularly about the axis of rotation wherein:

each platform comprises a main body and a connecting web, the main body slopes axially and angularly from the central support relative to the axis of rotation, the web interconnects the main body and the central support, with respect to each clamp jaw, the respective fan blade, and the respective platform, a mating portion of the clamp jaw is positioned in mating contact with a first side of the fan blade, and a mating portion of the main body of the platform is positioned in mating contact with a second side of the fan blade opposite to the first side, fasteners of the fasteners extend through the clamp jaw and the fan blade into the main body of the platform, and the clamp jaw and the main body of the platform span a majority of a width of a root of the fan blade.

15. An extractor fan assembly for an extractor of a sugarcane harvester, the extractor fan assembly comprising:

a motor comprising an output that rotates about an axis of rotation, fan blades, and a clamshell hub comprising a base and clamp jaws, the base coupled to the output for rotation therewith about the axis of rotation, the clamp jaws positioned angularly about the axis of rotation, each clamp jaw fastened to and cooperating with the base to clamp a respective fan blade of the fan blades therebetween to position the fan blades angularly about the axis of rotation, wherein, with respect to each clamp jaw and the respective fan blade, the clamp jaw spans a majority of a width of the fan blade.

16. The extractor fan assembly of claim 15, wherein:

the base comprises a central support and platforms, the central support receives and is coupled to the output for rotation of the base therewith about the axis of rotation, the platforms are coupled to and positioned angularly about the central support relative to the axis of rotation, and with respect to each clamp jaw and the respective fan blade, the clamp jaw is fastened to and cooperates with a respective platform of the platforms to clamp the fan blade therebetween, and the respective platform spans a majority of the width of the fan blade.

17. The extractor fan assembly of claim 15, wherein, with respect to each clamp jaw and the respective fan blade, the clamp jaw spans the width of the fan blade.

* * * * *